(12) United States Patent
Bando et al.

(10) Patent No.: US 10,530,772 B2
(45) Date of Patent: Jan. 7, 2020

(54) COMMUNICATION APPARATUS

(71) Applicant: Toshiba Memory Corporation, Minato-ku (JP)

(72) Inventors: Yosuke Bando, Yokohama (JP); Masahiro Ishiyama, Kawasaki (JP)

(73) Assignee: Toshiba Memory Corporation, Minato-ku (JP)

( * ) Notice: Subject to any disclaimer, the term of this patent is extended or adjusted under 35 U.S.C. 154(b) by 630 days.

(21) Appl. No.: 15/256,782

(22) Filed: Sep. 6, 2016

(65) Prior Publication Data

US 2017/0237732 A1 Aug. 17, 2017

Related U.S. Application Data

(60) Provisional application No. 62/294,331, filed on Feb. 12, 2016.

(51) Int. Cl.
| | |
|---|---|
| *H04L 29/06* | (2006.01) |
| *H04B 7/155* | (2006.01) |
| *H04W 12/04* | (2009.01) |
| *H04W 12/06* | (2009.01) |

(52) U.S. Cl.
CPC ........ *H04L 63/0876* (2013.01); *H04L 63/123* (2013.01); *H04B 7/15521* (2013.01); *H04W 12/04* (2013.01); *H04W 12/06* (2013.01)

(58) Field of Classification Search
CPC .................................................. H04L 63/0876
USPC ............................................................. 726/6
See application file for complete search history.

(56) References Cited

U.S. PATENT DOCUMENTS

| | | | |
|---|---|---|---|
| 8,028,159 B2* | 9/2011 | Li | H04L 63/0428 |
| | | | 713/150 |
| 8,131,998 B2 | 3/2012 | Wang et al. | |
| 8,964,739 B1* | 2/2015 | Wisehart | H04L 45/24 |
| | | | 370/389 |
| 10,164,776 B1* | 12/2018 | Perdomo | H04L 9/14 |
| 2003/0233455 A1 | 12/2003 | Leber et al. | |

(Continued)

FOREIGN PATENT DOCUMENTS

| | | |
|---|---|---|
| JP | 2005-149040 | 6/2005 |
| JP | 2015-56691 | 3/2015 |

OTHER PUBLICATIONS

Rosario Gennaro, et al., "How to Sign Digital Streams", Advances in Cryptology (CRYPTO '97), Lecture Notes in Computer Science, vol. 1294, 1997, 18 pgs.

*Primary Examiner* — Peter C Shaw
(74) *Attorney, Agent, or Firm* — Oblon, McClelland, Maier & Neustadt, L.L.P.

(57) ABSTRACT

According to one embodiment, a communication apparatus is provided. The communication apparatus receives first content including first additional information from a first terminal, generates second additional information, adds the second additional information to second content, and transmits the second content to a second terminal. The second additional information includes an authentication code unique to blocks in the second content and the communication apparatus and a signature unique to the authentication code. The communication apparatus generates receipt information and transmits the receipt information to an external apparatus when a transmission source of the first content is verified to be the first terminal based on the first additional information.

19 Claims, 10 Drawing Sheets

(56) References Cited

U.S. PATENT DOCUMENTS

| | | | |
|---|---|---|---|
| 2004/0153668 A1* | 8/2004 | Baier Saip | G06F 21/31 |
| | | | 726/5 |
| 2008/0222414 A1* | 9/2008 | Wang | H04L 9/0643 |
| | | | 713/161 |
| 2010/0037060 A1 | 2/2010 | Irvine | |
| 2010/0085947 A1* | 4/2010 | Ringland | H04W 28/00 |
| | | | 370/338 |
| 2012/0296996 A1* | 11/2012 | Lehavi | H04L 41/0681 |
| | | | 709/206 |
| 2015/0071155 A1 | 3/2015 | Miyamoto et al. | |
| 2015/0296349 A1 | 10/2015 | Ishiyama et al. | |

\* cited by examiner

COMMUNICATION APPARATUS

CROSS-REFERENCE TO RELATED APPLICATIONS

This application is based upon and claims the benefit of priority from U.S. Provisional Application No. 62/294,331, filed on Feb. 12, 2016; the entire content of which are incorporated herein by reference.

FIELD

Embodiments described herein relate generally to a communication apparatus.

BACKGROUND

A method of delivering common data such as content to respective communication apparatuses by performing transmission and reception of data between the communication apparatuses is known. In this method, the communication apparatus performs a data relay by transmitting received data to another communication apparatus. Information (receipt information) related to the reception of the data relay is used as a material for provision of a reward to the communication apparatus contributing to the data relay, or as a material for analysis of delivery efficiency, marketing, or the like.

However, there is a possibility of the receipt information being altered. Thus, it is desirable to collect the receipt information while preventing the receipt information from being altered.

DETAILED DESCRIPTION

According to one embodiment, there is provided communication apparatus. The communication apparatus includes a data sender/receiver. The data sender/receiver receives first content from a first terminal. The first content includes first to n-th (n is an integer of 2 or more) blocks and first additional information unique to the first terminal. The data sender/receiver generates second content, and transmits the second content to a second terminal. The second content includes the first to n-th blocks and second additional information unique to the communication apparatus. The data sender/receiver includes a relay authenticator. The relay authenticator generates the second additional information. The second additional information includes first to n-th block authentication codes, a first content authentication code, and a first signature. The p-th (p is an integer of 1 or more and n or less) block authentication code is information corresponding to the communication apparatus and the p-th block. The first content authentication code is information based on the communication apparatus and the first to n-th blocks. The first signature is information based on the first content authentication code. The relay authenticator generates receipt information indicating that the first content has been received when a transmission source of the first content is determined to be the first terminal based on the first additional information. The data sender/receiver transmits the receipt information to an external apparatus.

Exemplary embodiments of a communication apparatus will be explained below in detail with reference to the accompanying drawings. The present invention is not limited to the following embodiments.

Embodiment

Figure 1:
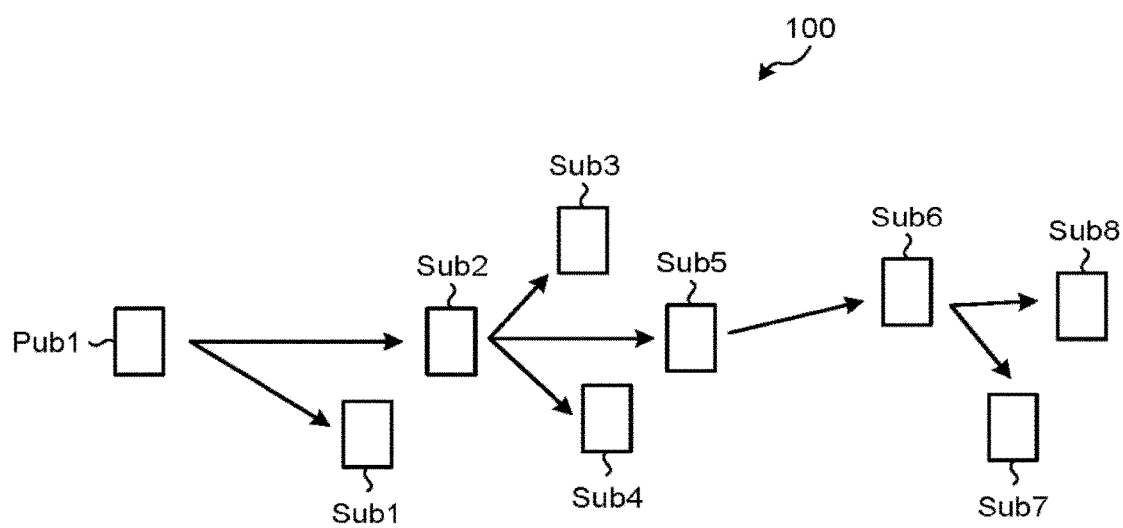
FIG. 1 is a diagram illustrating a configuration of a communication network according to an embodiment.

FIG. 1 is a diagram illustrating a configuration of a communication network according to an embodiment. A communication network 100 is a communication system in which a publisher (for example, a content server) Pub1 serving as a data source performs, for example, content delivery to a subscriber (a subscriber Sx which will be described later) serving as a communication apparatus. A description of the present embodiment will proceed with an example in which the subscriber Sx performs data delivery through wireless communication, but the subscriber Sx may perform the data delivery through wired communication. In the following description, the publisher Pub1 or the subscriber Sx that transmit content is also referred to as a "transmission terminal Ds". Further, the subscriber Sx that receives content is also referred to as a "reception terminal Dr".

The communication network 100 includes one or more publishers Pub1 as a delivery source that perform ad-hoc content delivery. The communication network 100 includes M (M is a natural number of 2 or more) subscribers Sub1, Sub2, . . . , and SubM that perform a relay of content. The following description will proceed with an example in which M=8, but M may be 2 to 7 or may be 9 or more. In the following description, one or more of the subscribers Sub1 to Sub8 are also referred to as a "subscriber Sx".

FIG. 1 illustrates an example of a delivery path for transferring content to all the subscribers Sx, and it is understood that the number of relays differs depending on each subscriber Sx. Since the delivery path changes according to the number of subscribers Sx to which each subscriber Sx relays content, a relay load and a content delivery path of each subscriber Sx are known if the receipt information (a receipt which will be described later) is collected from each subscriber Sx. The receipt information is information for verifying the data relay between the subscriber Sx.

In the communication network 100, the subscriber Sx repeatedly performs the data relay, and thus each subscriber Sx can acquire content transmitted from the publisher Pub1. The publisher Pub1 and the subscriber Sx are wireless communication terminals such as mobile phones or tablet terminals.

The subscriber Sx is configured to be able to receive content and relay the received content. The subscriber Sx receives content from another subscriber Sx or the publisher Pub1, and relays the content to another subscriber Sx as necessary. As described above, in the communication network 100, the ad hoc content delivery is performed to relay content. As a result, content can be delivered up to many distant subscribers Sx which direct wireless communication from the publisher Pub1 that initially transmits content does not necessarily reach.

Such peer-to-peer content delivery using a portable wireless communication apparatus such as a mobile phone mainly is referred to as "mobile P2P communication (mobile ad hoc network communication)". Further, terminals including the publisher Pub1 and the subscriber Sx which is associated with the mobile P2P communication are referred to collectively as "mobile P2P terminals". In the mobile P2P communication, the subscriber Sx sequentially transmits data such as content to other subscribers Sx one by one in a unicast manner. Alternatively, the subscriber Sx simultaneously transmits data to a plurality of other subscribers Sx in a multicast/broadcast manner. For example, device-to-device proximity-based wireless communication such as Wi-Fi Direct is used as a data relay means.

In the communication network 100, for example, content is delivered from the publisher Pub1 to the subscribers Sub1 and Sub2. The subscriber Sub2 relays the received content to the subscribers Sub3 to Sub5. The subscriber Sub5 relays the received content to the subscriber Sub6. Then, the subscriber Sub6 relays the received content to the subscribers Sub7 and Sub8. Then, the receipt information is collected from the subscribers Sub1 to Sub8. Examples of a significance of collection of the receipt information include the following first to third significances.

(First Significance)

The receipt information can be used as a ground for giving an incentive for the data relay to the subscriber Sx. When only reception of content directed to itself is the purpose of each subscriber Sx, it is not beneficial to the subscriber Sx to allocate additional resources (a time, a network band, electric power, and a calculation load of a CPU or the like) and relay received data. For this reason, free riding of having only a benefit (content reception) and making no contribution to a peer-to-peer network is an optimal action for each subscriber Sx, but when all the subscribers Sx take this action, the peer-to-peer network does not function. In this regard, the publisher Pub1 or a third party is considered to give a certain reward for encouraging the relay act of the subscriber Sx. The reward may be money or certain privileges such as a content reception priority right. It is reasonable to give many rewards to the subscriber Sx that has performed many relays, and thus, there is significance in collection of the receipt information related to the relay act of each subscriber Sx.

(Second Significance)

The receipt information can be used as information for analyzing the delivery efficiency. An efficiency (a period of time taken to transfer content, electric power consumed during that period of time, or the like) for transferring content to all the subscribers Sx greatly depends on the delivery path. Further, since the delivery path depends on the subscriber Sx that transmits relay data and the number of subscribers Sx to which the relay data is transmitted, the receipt information is important information in analyzing the delivery efficiency. For example, when a relay load of a certain subscriber Sx is found to be higher than those of the other subscribers Sx, countermeasures for improving the delivery efficiency, for example, an action of giving an instruction to change a relay path or timing to the corresponding subscriber Sx and its neighboring subscribers Sx can be taken.

(Third Significance)

The receipt information can be used for marketing. When the subscriber Sx is a mobile terminal and uses proximity-based wireless communication for inter-terminal communication for a relay, the fact that a relay is performed between terminals indicates that users of both terminals stay close to each other during a certain period of time. Further, when each of the users has a subscription list based on their own interest, the fact that the relay is performed indicates a possibility that the users share a common interest. Thus, by collecting the receipt information, the third party can infer an interest of the user or a relation (intimacy or the like) between the users, and the receipt information can be used for improvements or promotions of products of a third party or services to be provided.

As described above, there is significance in that the publisher or the third party collects the receipt information from the subscriber Sx. However, there are cases in which the subscriber Sx receives a reward wrongfully due to an alteration or a fabrication of information or incurs a reduction in the delivery efficiency or marketing disturbance. In the present embodiment, a mechanism for preventing such an alteration or the like is provided.

The subscriber Sx of the present embodiment has a function of notifying the third party of the receipt information to make it difficult to alter the fact that there was data communication from a certain subscriber Sx to another subscriber Sx. Specifically, the subscriber Sx allocates a message authentication code unique to the subscriber Sx to each of blocks obtained by dividing content. Further, the subscriber Sx generates a signature $\sigma$ (a digital signature $\sigma$) in which the message authentication codes of a plurality of blocks are input. Then, the subscriber Sx adds the message authentication code and the signature to content, and transmits the resulting content to another subscriber Sx. As a result, it is possible to prevent the alteration of the receipt information related to the data relay between the subscribers Sx.

Figure 2A:
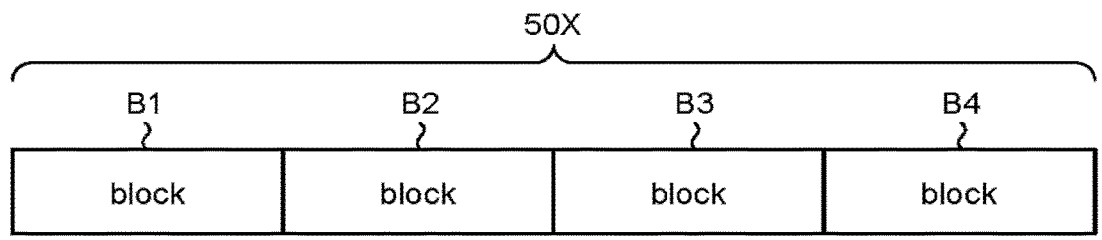
FIGS. 2A to 2D are diagrams for describing a data transmission method according to an embodiment.
Figure 2B:
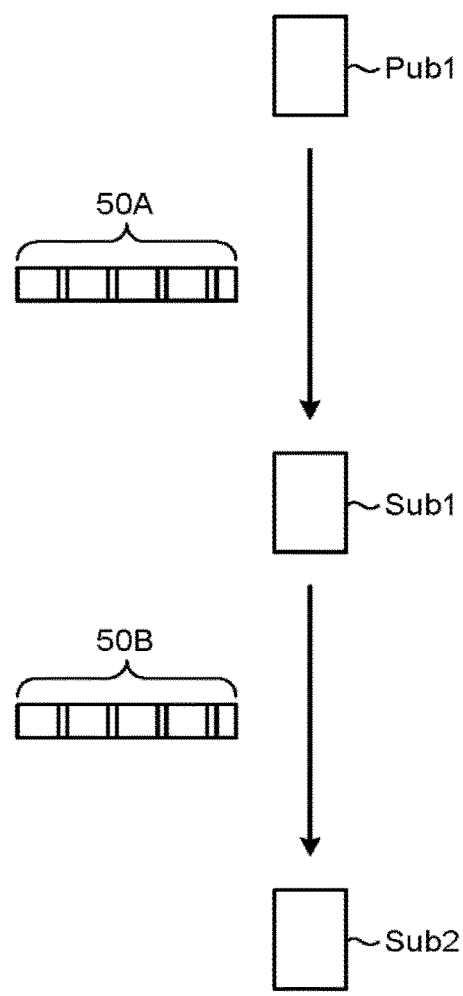
Figure 2C:
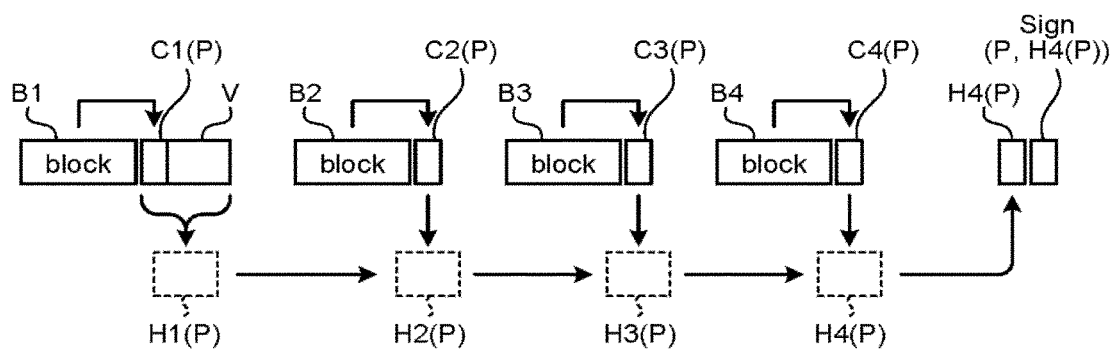
Figure 2D:
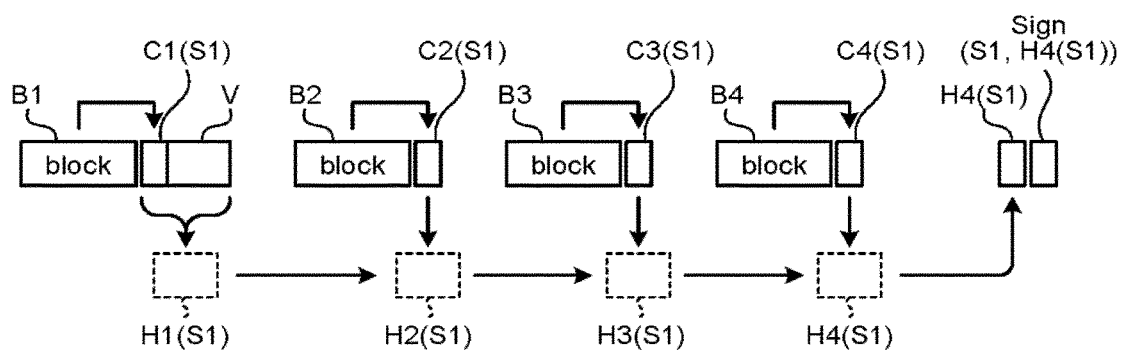

FIGS. 2A to 2D are diagrams for describing a data transmission method according to an embodiment. FIG. 2A illustrates a block configuration of content (source data) 50X serving as digital content. FIG. 2B illustrates a transceiving order of content. FIG. 2C illustrates a configuration of data generated by the publisher Pub1, and FIG. 2D illustrates a configuration of data generated by the subscriber Sub1.

The content 50X is configured with a plurality of blocks illustrated in FIG. 2A. In other words, data of the content 50X is divided into blocks of transmission units. In this example, the content 50X is configured with blocks B1 to B4. The publisher Pub1 of the present embodiment generates content 50A using the content 50X. The content 50A is content in which certain information (additional information) generated by the publisher Pub1 is added to the content 50X. Thus, the content 50A includes the content 50X and additional information generated by the publisher Pub1. The additional information is information indicating that the subscriber Sx has transmitted (relayed) data.

In the following description, the additional information generated by the transmission terminal Ds (any one of the publisher Pub1 and the subscribers Sub1 to Sub8) is also referred to as "additional information INFO (Ds)". For example, the additional information generated by the publisher Pub1 is additional information INFO (Pub1).

After the content 50A is generated, the publisher Pub1 delivers the content 50A to the subscriber Sub1 as illustrated in FIG. 2B. Thus, the subscriber Sub1 receives the content 50A including the additional information INFO (Pub1).

Then, the subscriber Sub1 extracts the content 50X and the additional information INFO (Pub1) generated by the publisher Pub1 from the content 50A. Further, the subscriber Sub1 generates content 50B using the content 50X The content 50B is content in which additional information INFO (Sub1) generated by the subscriber Sub1 is added to the content 50X. Thus, the content 50B includes the content 50X and the additional information INFO (Sub1) generated by the subscriber Sub1.

After the content 50B is generated, the subscriber Sub1 transmits (relays) the content 50B to the subscriber Sub2. Thus, the subscriber Sub2 receives the content 50B including the additional information INFO (Sub1). Then, the subscriber Sub2 extracts the content 50X and the additional information INFO (Sub1) generated by the subscriber Sx from the content 50B. In the following description, the content 50X, 50A, and 50B are referred to individually or collectively as "content 50".

The additional information INFO (Pub1) generated by the publisher Pub1 includes the message authentication code (block authentication code) unique to the publisher Pub1 and the signature σ generated by the publisher Pub1. For example, a message authentication code (a block authentication code) Ci(Ds) unique to the transmission terminal Ds (any one of the publisher Pub1 and the subscribers Sub1 to Sub8) is allocated to an i-th (i is a natural number) block Li as illustrated in FIGS. 2C and 2D.

In the following description, the message authentication code unique to the publisher Pub1 is described as a unique message authentication code Ci (P) Further, the message authentication code unique to the subscriber Sx is described as a unique message authentication code Ci(Sx). For example, a message authentication code unique to the subscriber Sub1 is a unique message authentication code Ci(S1).

Here, the publisher Pub1 adds the message authentication code Ci(P) to each block Bi. Further, the publisher Pub1 adds the signature σ to the content 50X. Content in which the message authentication code Ci(P) and the signature σ are added to the content 50X is the content 50A.

Similarly, the subscriber Sub1 adds the message authentication code Ci(P) to each block Bi. Further, the subscriber Sub1 adds the signature σ to the content 50X. Content in which the message authentication code Ci(S1) and the signature σ are added to the content 50X is the content 50B. For example, the message authentication code Ci(Ds) is calculated using a hash-based message authentication code (HMAC). The signature σ is generated based on a hash (cryptographic hash) value in which the message authentication codes Ci(Ds) are chained. For example, an RSA public-key cryptosystem (public-key cryptosystem) is used for the signature σ.

Figure 3A:
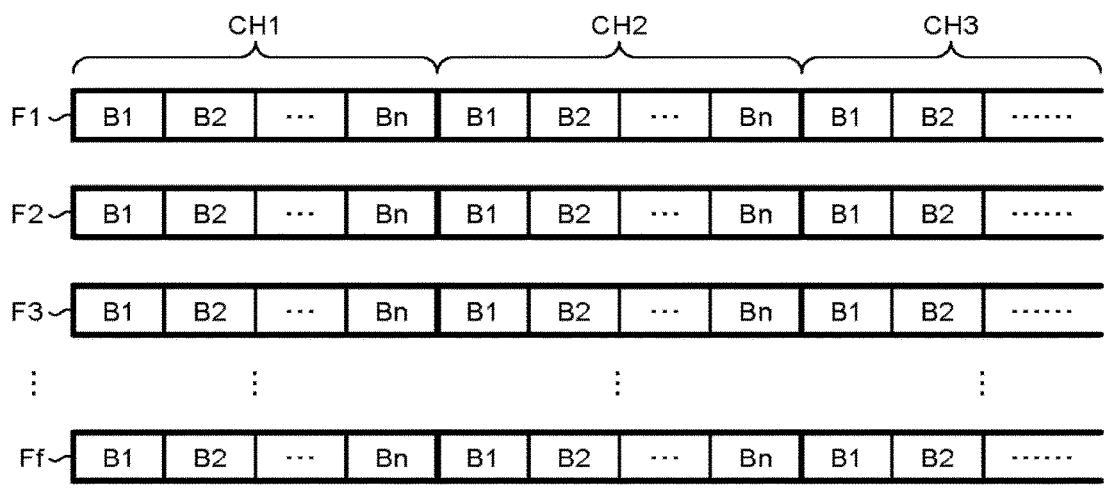
FIGS. 3A and 3B are diagrams illustrating a data configuration of content.

Here, a data configuration of the content 50X will be described. FIGS. 3A and 3S are diagram illustrating a data configuration of content. FIG. 3A illustrates a file configuration in the content 50X. FIG. 3E illustrates a configuration of a ToC serving as information of files in the content 50X.

The content 50X includes a set of files (files F1 to Ff) (f is a natural number) storing digital data of photographs, video, audio, documents, or the like, and a table of contents (ToC) including information thereof.

A size of each file is arbitrary, and each file is divided into units (for example, 1 MB) called chunks for the sake of convenience of delivery. A chunk is further divided into n blocks (having a size of, for example, 1 kB).

FIG. 3A illustrates an example in which the content 50X includes the files F1 to Ff, and each of the files F1 to Ff includes chunks CH1 to CH3. Each of the chunks CH1 to CH3 includes blocks B1 to Bn. In FIG. 3A, the blocks B1 to Bn are indicated by "B1", "B2", . . . , "Bn". Here, a first block of each chunk is indicated by "B1", and an n-th block is indicated by "Bn", but data in a block differs according to each file and each chunk.

Figure 3B:
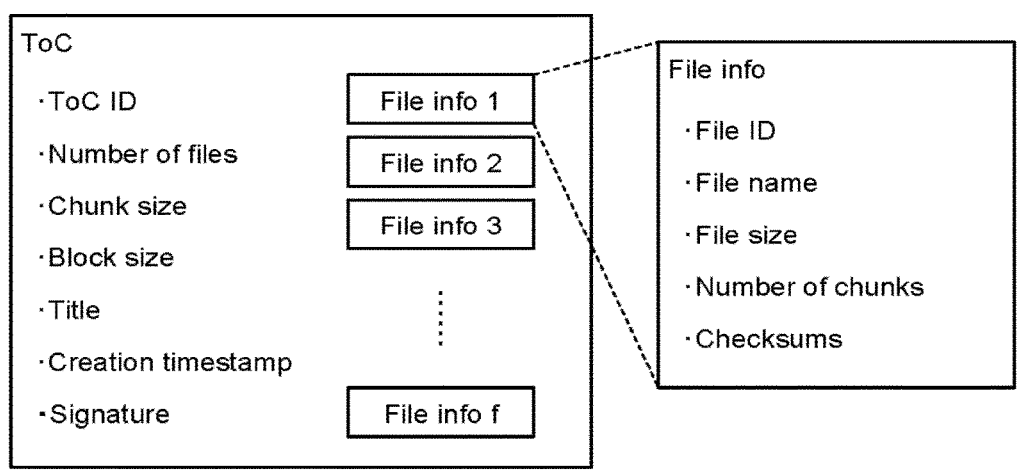

The ToC includes a ToC ID identifying a ToC, the number of files constituting the content 50X, a chunk size, a block size, a title of the content 50X, a time (a creation timestamp) at which the content 50X is created, the signature σ of a content creator, and the like as illustrated in FIG. 3B.

The ToC further includes file info of each file. Each file info includes a file ID, a file name, a file size, the number of chunks included in a file, and a checksum (reference checksum) of each chunk.

The publisher Pub1 transmits the content 50A to the subscriber Sub1, and the subscriber Sub1 transmits the content 50B to another subscriber Sub2 as illustrated in FIG. 2B. The publisher Pub1 may be the content creator or may be a terminal that receives a request from the content creator to be a content source.

When the publisher Pub1 delivers the content 50X, the publisher Pub1 first delivers the ToC to the subscriber Sx. Then, the subscriber Sx determines whether or not content is content to be received with reference to the ToC. Even when the subscriber Sx does not need the content, the subscriber Sx may determine to receive the content in order to relay the content to another subscriber Sx. The data size of the ToC is commonly smaller than a total size of a group of files constituting content, and a delivery load is also small. Thus, the ToC may be transmitted to the subscriber Sx using a network infrastructure with no intervention of the peer-to-peer network.

The subscriber Sx may operate as the transmission terminal Ds (a sender) and may operate as the reception terminal Dr (a receiver). In data transfer from the transmission terminal Ds to the reception terminal Dr, data may be lost, or an error may occur due to a communication failure. The reception terminal Dr determines it in units of blocks. In other words, when an i-th (i=1, 2, . . . , n) block Bi in a chunk is transmitted, the transmission terminal Ds transmits a block number i together, and thus the reception terminal Dr can detect a number of a lost block. By encoding the block Bi through the forward error correction, the reception terminal Dr can correct an error up to a certain level and detect an error that cannot be corrected. Alternatively, the reception terminal Dr may detect an error through a checksum and may determine that there is a loss. As a result, a block is either properly received or lost. When a block is lost, the reception terminal Dr requests the transmission terminal Ds to retransmit the lost block, and the transmission terminal Ds retransmits the lost block Bi.

Upon receiving all blocks in a chunk, the reception terminal Dr calculates a checksum of the chunk, and checks whether or not the calculated checksum is identical to a corresponding checksum of the ToC. When the calculated checksum is identical to the corresponding checksum of the ToC, the received chunk can be confirmed to be data generated by the content creator. When the calculated checksum is not identical to the corresponding checksum of the ToC, regardless of an occurred error, it is determined to be data that is unreliable, for example, the content 50X is determined to be altered, and the chunk is discarded.

In the present embodiment, a unit of verifying that one chunk has been transmitted from the transmission terminal Ds to the reception terminal Dr is provided. For example, the subscriber Sub1 may acquire all chunks constituting the content 50X from the publisher Pub1 or may receive all chunks constituting the content 50X relayed from another subscriber Sub2 or the like. Further, the subscriber Sub1 may receive different chunks from a plurality of terminals including several terminals among the publisher Pub1 and the subscribers Sub2 to Sub8. The subscriber Sx completes the reception of the content 50X when all chunks are finally acquired. A path through which the content 50X is delivered to the subscriber Sub1 may differ according to a chunk. Thus, the additional information INFO (Ds) is assumed to be output in units of chunks.

In the present embodiment, since reception verification is performed in units of chunks, the number of chunks included in content is hereinafter assumed to be 1 for the sake of simplification of description. In a subsequent context, content and a chunk are interchangeable, and the reception verification is described as a process for the entire content. An extension to when a plurality of chunks are included in content is straightforward. The reception terminal Dr and one or more transmission terminals perform a process on a single chunk for each of a plurality of chunks. Since the subscriber Sub1 may receive different chunks from a plurality of terminals as described above, for example, when a certain chunk is received from the publisher Pub1, a reception verification process is performed on the corresponding chunk between the publisher Pub1 serving as the sender and the subscriber Sub1 serving as the receiver. When another chunk is received from the subscriber Sub2, the reception verification process is performed on the corresponding chunk between the subscriber Sub2 serving as the sender and the subscriber Sub1 serving as fine receiver. In the present embodiment, since reception verification is performed in units of chunks, it is necessary to receive all of a plurality of blocks included in a chunk from the same sender. The reception verification is designed to fail when performed on a chunk obtained by collecting blocks received from different senders.

The following description will proceed with an example of delivering content in the unicast manner from the sender to the receiver, but the present embodiment can be applied even when content is collectively delivered to a plurality of receivers in the multicast/broadcast manner. In that case, the reception verification is performed for each pair of the sender and one of the receivers. The verification process performed by the sender is the same regardless of whether the unicast manner is used or the multicast/broadcast manner is used. Each receiver performs the reception verification process on the received chunk with the sender regardless of whether the sender uses the unicast manner or the multicast/broadcast manner.

FIGS. 2C and 2D illustrate a method of generating data (the content 50A and 50B) to be transmitted by the transmission terminal Ds from the blocks B1, B2, . . . , Bn (here, n=4) constituting a certain chunk of the published content data 50X.

The transmission terminal Ds allocates the message authentication code Ci(Ds) unique to the transmission terminal Ds (=any one of P, S1, S2, . . . ) to the i-th block Bi. For example, this can be calculated by the following Formula (1) using the hash-based message authentication code (HMAC).

$$Ci(Ds)=\text{Hash}((Km(Ds)+O)|\text{Hash}((Km(Ds)+I)|Bi)) \quad (1)$$

Here, Hash( ) is a cryptographic hash function, and, for example, SHA-1 is used. "+" is an exclusive OR, and "|" indicates a concatenation of data. "O" is an outer padding (for example, a fixed value of 0x5c5c5c . . . 5c or the like).

Further, "I" is an inner padding (for example, a fixed value of 0x363636 . . . 36 or the like), and Km(Ds) is a MAC secret key of the terminal Ds. The hash value in which the message authentication codes are chained is calculated. The hash value of up to Hn(Ds) is sequentially calculated by the following Formula (2) using a certain initial value V.

$$H1(Ds)=\text{Hash}(V|C1(Ds)),$$

$$H2(Ds)=\text{Hash}(H1(Ds)|C2(Ds)),$$

$$H3(Ds)=\text{Hash}(H2(Ds)|C3(Ds)) \quad (2)$$

Of these, the transmission terminal Ds transmits the initial value V and a hash chain tail Hn(Ds) serving as a final hash value. Then, the transmission terminal Ds does not transmit the other hash values Hi(Ds) (i<n). Further, the transmission terminal Ds adds Sign(Ds, Hn(Ds)) serving as the signature σ to the final hash value, and transmits the resulting final hash value as well. Sign(Ds, Hn(Ds)) is the signature σ of the hash value Hn(Ds) by the transmission terminal Ds. Since the message authentication code (MAC) unique to the transmission terminal Ds is used, the hash value Hn(Ds) depends on the terminal Ds. Thus, the additional information has the following features.

(First Feature)

Since a MAC unique to the transmission terminal Ds is allocated to each lock Bi, the reception terminal Dr can distinguish the direct transmission terminal Ds. For example, referring to FIG. 2D, a MAC Ci(S1) added by the subscriber Sub1 that performs a relay is added to data to be received by the subscriber Sub2, and the MAC Ci(S1) is different from a MAC Ci(P) added by the publisher Pub1. Hereinafter, the message authentication code Ci(Ds) is also referred to as a "MAC Ci(Ds)" or "MAC".

(Second Feature)

The transmission terminal Ds adds the signature σ=Sign(Ds, Hn(Ds)) of the transmission terminal Ds to the final hash value (the hash chain tail Hn(Ds)) in which the MACs Ci(Ds) unique to the transmission terminal Ds are chained. Thus, the reception terminal Dr can confirm that all MACs i(Ds) allocated to the blocks constituting the chunk are associated with the transmission terminal Ds and further verify it to the third party.

(Third Feature)

Since the transmission terminal Ds does not transmit the interim hash values Hi(Ds) (i<n), the reception terminal Dr can hardly confirm correctness of the final hash value Hn(Ds) included in the signature σ unless the reception terminal Dr receives all the MACs attached to the chunk data, that is, all the blocks B1, B2, . . . , Bn and calculates the hash value Hi(Ds).

In a common MAC usage method, the transmission terminal Ds and the reception terminal Dr share the MAC secret key Km(Ds). The reception terminal Dr calculates a MAC of received data using Km(Ds), and, when the calculated MAC is identical to a MAC that is generated and transmitted by the transmission terminal Ds, determines that the received data is data transmitted front the transmission terminal Ds.

A different usage method from common MAC usage method is applied to the communication network 100 of the present embodiment. In the communication network 100, each transmission terminal Ds has a unique MAC secret key Km(Ds) and does not share the MAC secret key Km(Ds) with the other transmission terminals Ds. For this reason, the reception terminal Dr (the subscriber Sx) does not use the MAC for authentication of data. The reception terminal Dr identifies the transmission terminal Ds using the signature σ=Sign(Ds, Hn(Ds)) attached to the hash chain tail Hn(Ds) of the MAC. The reception terminal Dr verifies that the content 50X is neither altered or lost, that is, integrity of the content 50X using a checksum (which is not unique to the transmission terminal Ds) described in the ToC.

In the signature σ using the public-key cryptosystem, each of the terminals D (the transmission terminal Ds and the reception terminal Dr) has a public key Kp(D) and a secret key Ks(D), and registers the public key Kp(D) in a certificate authority that is the third party and opens the public key Kp(D) to the public. If encryption of message data M using a key K is indicated by Encrypt(K, M), and decryption thereof is indicated by Decrypt(K, M), a relation of Decrypt (Kp, Encrypt(Ks, M))=M holds. When the signature σ is allocated to certain message data M, the message data M is encrypted using the secret key Ks(D). That is, the signature σ is expressed as Sign(D, M)=Encrypt(Ks(D), M). When the data size of the message data M is large, encryption may be performed using a hash value. In this case, the signature σ is given by Sign(D, M)=Encrypt(Ks(D), Hash(M)). The signature method using the public-key cryptosystem is operated to satisfy the following three conditions:

Data encrypted using the secret key Ks(D) can be decrypted using only the public key Kp(D):

the certificate authority guarantees that the public key Kp(D) is associated with the terminal D; and the secret key Ks(D) for generating the signature σ Sign(D, M) is known only to the terminal D.

Due to the above three points, if the message data M and the signature σ=Sign(D, M) are given, the other terminals DT can understand that the message data M is data transmitted front the terminal D when Decrypt(Kp(D), σ) is identical to the message data M or Hash(M).

The verification to the third party of the fact that a relay has been performed is performed such that the reception terminal Dr (=any one of S1, S2, . . . ) issues the receipt information (receipt) serving as the reception verification to the third party. The receipt includes a transmission terminal ID(Ds) serving as identification information of the transmission terminal Ds and a reception terminal ID(Dr) serving as identification information of the reception terminal Dr, and the signature σ of the reception terminal Dr is added to the receipt. In addition, the receipt may include information such as a transmission time Ts, a reception time Tr, the number n of blocks, a received data size L of a chunk, an ID (a ToC ID) identifying a chunk, a file ID, a chunk ID. Thus, the receipt is data including, for example, ID(Ds), ID(Dr), Ts, Tr, n, L, a ToC ID, a file ID, a chunk ID, and Sign(Dr, Ds|Dr|Ts|Tr|n|L|ToC ID|file ID|chunk ID).

Here, a specific example of the additional information INFO (Pub1) generated by the publisher Pub1 will be described. The publisher Pub1 serving as the transmission terminal Ds allocates the message authentication code C1(P) unique to the publisher Pub1 to the first block B1 as illustrated in FIG. 2C. Here, C1(P) C1(P)=Hash((Km(P)+O)|Hash((Km(P)+I)|B1)) according to Formula (1). Km(P) is a MAC secret key held in the publisher Pub1. The publisher Pub1 calculates a hash value H1(P) using the initial value V. Here, H1(P) is H1(P)=Hash(V|C1(P)) according to Formula (2).

The publisher Pub1 allocates the message authentication code C2(P) unique to the publisher Pub1 to the second block B2. Here, C2(P) is C2(P)=Hash((Km(P)+O)|Hash((Km(P)+I)|B2)) according to Formula (1). The publisher Pub1 calculates a hash value H2(P) using the hash value H1(P) and C2(P). Here, H2(P) is H2(P) Hash(H1(P)|C2(P)) according to Formula (2).

Similarly, the publisher Pub1 allocates C3(P)=Hash((Km(P)+O)|Hash((Km(P)+I)|B3)) to the third block 133 according to Formula (1). The publisher Pub1 calculates H3(P)=Hash(H2(P)|C3(P)) according to Formula (2) using the hash value H2(P) and C3(P).

Similarly, the publisher Pub1 allocate C4(P)=Hash((Km(P)+O)|Hash((Km(P)+I)|B4)) to the fourth block B4 according to Formula (1). The publisher Pub1 calculates H4(P)=Hash(H3(P)|C4(P)) according to Formula (2) using the hash value H3(P) and C4(P).

The first block B1 is a block including a first data string among data strings including the blocks B1 to B4, and the second block B2 is a block including a second data string among the data strings. The third block B3 is a block including a third data string among data strings, and the fourth block B4 is a block including a data string at the end of the data strings. Thus, data is read in the order of the block B1, the block B2, the block B3, and the block B4, and thus a consecutive data string is obtained.

The publisher Pub1 generates the signature σ=Sign(P, H4(P)) using the hash value H4(P). The publisher Pub1 transmits the content 50X and the additional information INFO (Pub1) to the subscriber Sub1 as the content 50A. Specifically, the publisher Pub1 transmits the block B1 and C1(P), the block B2 and C2(P), the block B3 and C3(P), the block B4 and C4(P), the hash value H4(P), and the signature σ=Sign(P, H4(P)) to the subscriber Sub1. In this case, the publisher Pub1 transmits the block B1 and C1(P), the block B2 and C2(P), the block B3 and C3(P), and the block B4 and C4(P) to the subscriber Sub1 in association with one another.

The subscriber Sub1 acquires the blocks B1 to B4 from the content 50A. In what follows, a specific example of the additional information INFO (Sub1) generated by the subscriber Sub1 will be described. The subscriber Sub1 serving as the transmission terminal Ds allocates the message authentication code C1(S1) unique to the subscriber Sub1 to the first block B1 as illustrated in FIG. 2D. Here, C1(S1) is C1(S1)=Hash((KM(S1)+O)|Hash((Km(S1)+I)|B1)) according to Formula (1). Km(S1) is a MAC secret key held in the subscriber Sub1. The subscriber Sub1 calculates a hash value H1(S1) using the initial value V. Here, H1(S1) is H1(S1)=Hash(V|C1(S1)) according to Formula (2).

The subscriber Sub1 allocates the message authentication code C2(S1) unique to the subscriber Sub1 to the second block B2. Here, C2(S1) is C2(S1)=Hash((Km(S1)+O)|Hash((Km(S1)+I)|B2)) according to Formula (1). The subscriber Sub1 calculates a hash value H2(S1) using the hash value H1(S1) and C2(S1). Here, H2(S1) is H2(S1)=Hash(H1(S1)|C2(S1)) according to Formula (2).

Similarly, the subscriber Sub1 allocates C3(S1)=Hash((Km(S1)+O)|Hash((Km(S1)+|B3)) to the third block B3 according to Formula (1). The subscriber Sub1 calculates H3(S1)=Hash(H2(S1)+C3(S1)) according to Formula (2) using the hash value H2(S1) and C3(S1).

Similarly, the subscriber Sub1 allocates C4(S1). Hash((Km(+O)|Hash((Km(S1)+I)|B)) to the fourth block B4 according to Formula (1). The subscriber Sub1 calculates H4(S1)=Hash(H3(S1)|C4(S1)) according to Formula (2) using the hash value H3(S1) and C4(S1).

The subscriber Sub1 generates the signature σ=Sign(S1, H4(S1)) using the hash value H4(S1). The subscriber Sub1 transmits the content 50X and the additional information INFO (S1) to the subscriber Sub2 as the content 50B. Specifically, the subscriber Sub1 transmits the block B1 and C1(S1), the block B2 and C2(S1), the block B3 and C3(S1), the block B4 and C4(S1), the hash value H4(S1), and the signature σ=Sign(S1, H4(S1)) to the subscriber Sub2.

Next, a configuration and an operation process of the subscriber Sx serving as a communication apparatus will be described. Since all the subscribers Sx have the same configuration, a configuration and an operation process of the subscriber Sub1 will be described below.

Figure 4:
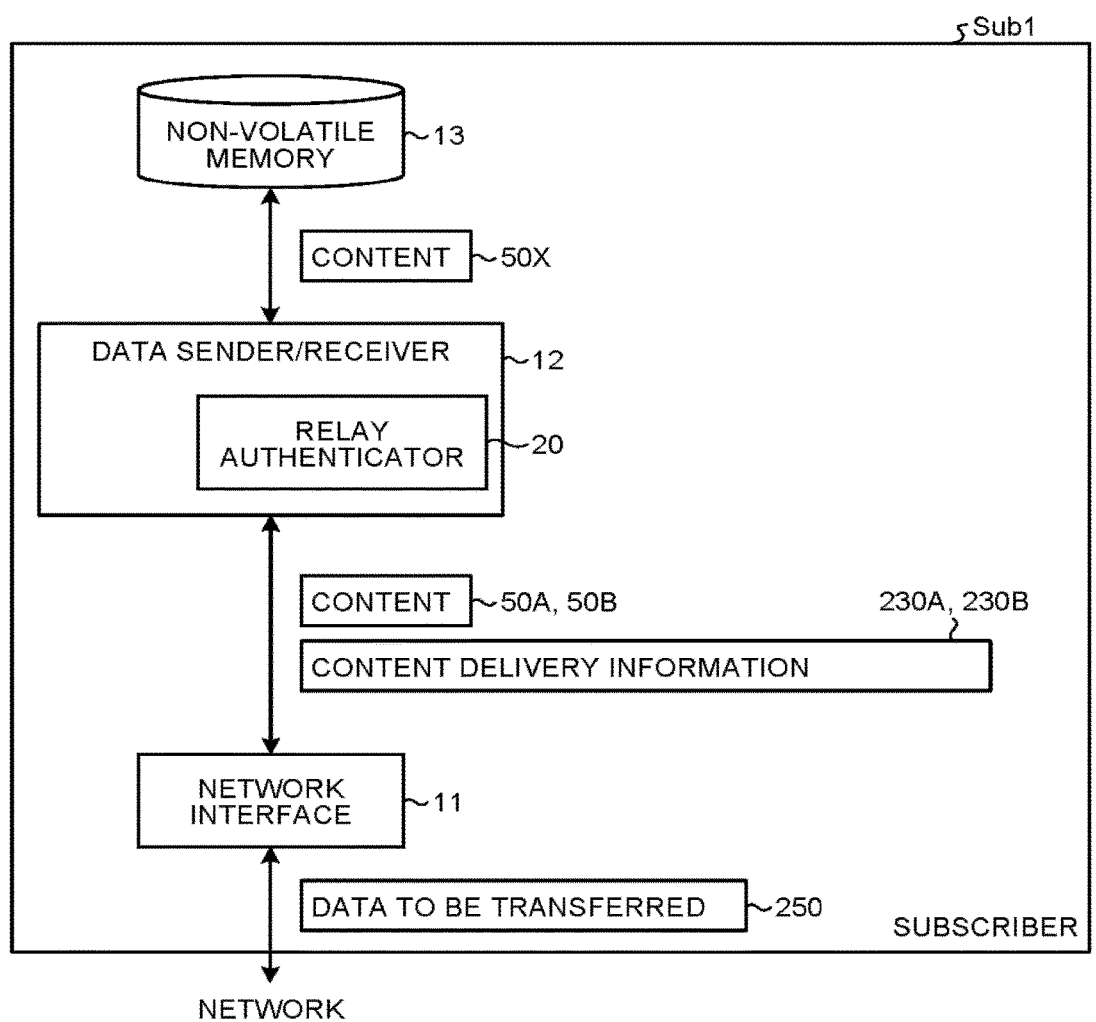
FIG. 4 is a block diagram illustrating a configuration of a communication apparatus according to an embodiment.

FIG. 4 is a block diagram illustrating a configuration of a communication apparatus according to an embodiment. The subscriber Sub1 serving as the communication apparatus includes a network interface 11, a data sender/receiver 12, and a storage such as non-volatile memory 13. The non-volatile memory 13 stores data to be transmitted, received data, and the like. The non-volatile memory 13 stores, for example, the content 50X and the like.

The network interface 11 is a device for transferring data using a network. The network interface 11 is an Ethernet (a registered trademark) card, a wireless LAN adapter, or the like.

The network provides a communication path with other terminals. The network is used for communication with other terminals such as the publisher Pub1 or the subscriber Sub1. Examples of the network include the Internet, a wired/wireless LAN, and a mobile phone network. Further, when the mobile P2P communication is performed, the network is a wireless communication path based on WiFi (a registered trademark) configured between nearby terminals or the like. The network interface 11 receives data (the content 50A) delivered from the publisher Pub1 or the like, and transmits data (the content 50B) delivered to the subscriber Sub2.

The data sender/receiver 12 receives the content 50A serving as the delivery data from the network interface 11 according to a certain content delivery protocol. The data sender/receiver 12 generates the content 50X and the additional information INFO (Pub1) from the received content 50A, and stores the content 50X and the additional information INFO (Pub1) in the non-volatile memory 13.

The data sender/receiver 12 reads the content 50X from the non-volatile memory 13, and generates the content 50B from the content 50X. Here, the content 50B includes the content 50X and the additional information INFO (Sub1). The data sender/receiver 12 transmits the content 50B to another terminal (the subscriber Sub2 or the like) through the network interface 11 according to a certain content delivery protocol.

The content delivery protocol used by the data sender/receiver 12 is described in, for example, U.S. Ser. No. 14/200,494, filed on Mar. 7, 2014, entitled "Communication Apparatus And Communication Method" and U.S. Ser. No. 14/493,581 filed on Sep. 11, 2014, entitled "Communication Apparatus And Communication Method". These patent applications are incorporated herein by reference. The data sender/receiver 12 adds first content delivery information (a publisher ID, a transmission terminal ID, a number when data is divided and transmitted, a checksum, and the like) based on the content delivery protocol when delivering the content 50B. In FIG. 4, the first content delivery information based on the content delivery protocol is indicated by content delivery information 230A.

The data sender/receiver 12 receives second content delivery information based on the content delivery protocol when receiving the content 50A. In FIG. 4, the second content delivery information based on the content delivery protocol is indicated by content delivery information 230B.

The data sender/receiver 12 includes a relay authenticator 20. When the data sender/receiver 12 receives the content 50A from the publisher Pub1, the relay authenticator 20 verifies the additional information INFO (Pub1) in the content 50A, and generates the receipt. Specifically, the relay authenticator 20 extracts the content 50X and the additional information INFO (Pub1) from the received content 50A. Then, the relay authenticator 20 verifies the additional information INFO (Pub1), and generates the receipt serving as the verification result.

Further, when the data sender/receiver 12 transmits the content 50B to the subscriber Sub1, the relay authenticator 20 adds the additional information INFO (Sub1) to the content 50X. Specifically, the relay authenticator 20 generates the additional information INFO (Sub1) based on the content 50X. Then, the relay authenticator 20 generates the content 50B by adding the additional information INFO (Sub1) to the content 50X.

The data sender/receiver 12 transmits the generated receipt to the third party (a relay information collector such as a network administration authority) using the network interface 11. At this time, the transmission path need not be P2P, and the receipt may be directly uploaded to, for example, a server provided by the third party.

The network interface 11 receives the content 50A from another terminal (the publisher Pub1 or the like), and transmits the content 50B to another terminal (the subscriber Sub2 or the like). The network interface 11 transmits the receipt to an external apparatus serving as the third party. In FIG. 4, communication data such as the content 50A and 50B and the receipt is indicated by data to be transferred 250.

Figure 5:
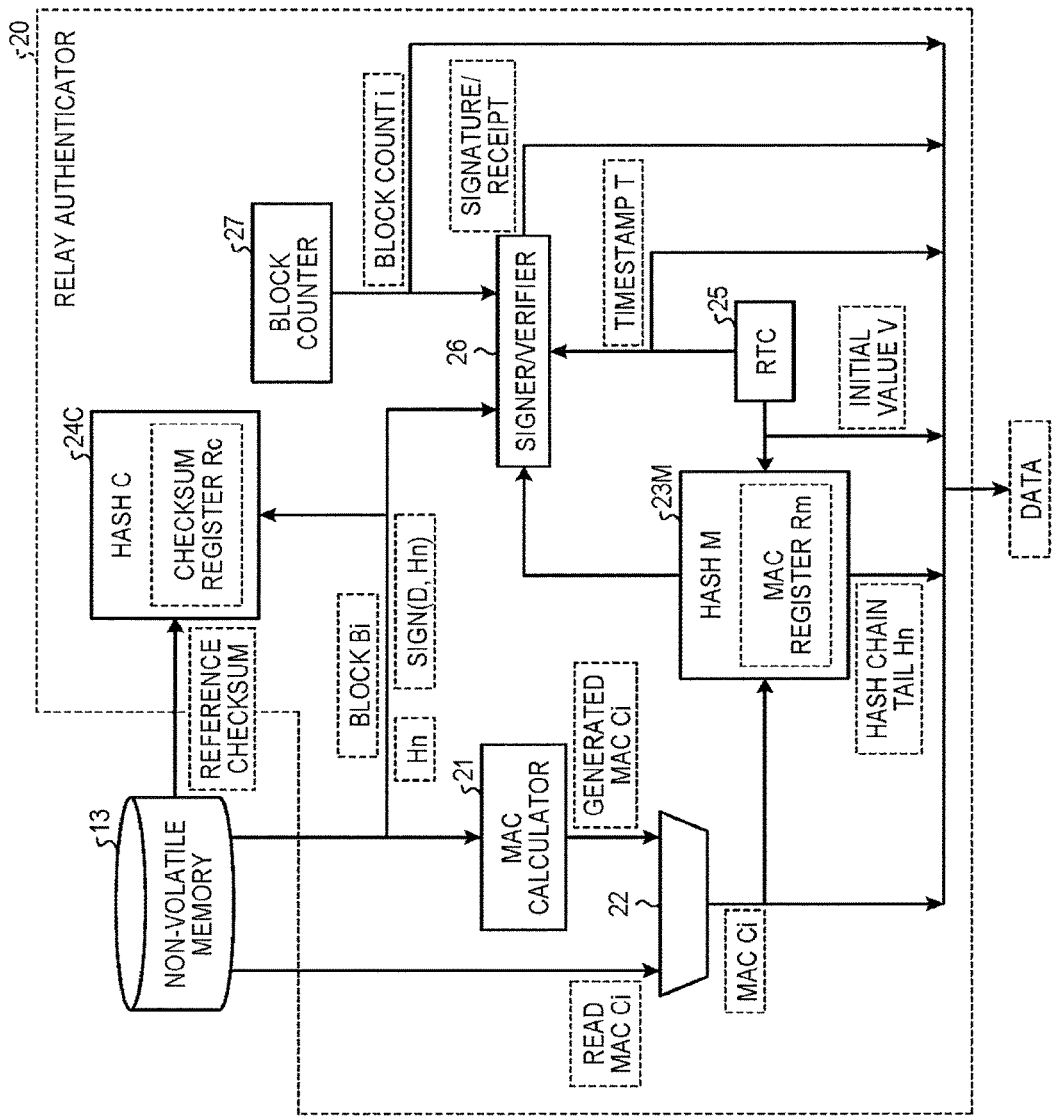
FIG. 5 is a block diagram illustrating a configuration of a relay authenticator according to an embodiment.

FIG. 5 is a block diagram illustrating a configuration of the relay authenticator according to an embodiment. The relay authenticator 20 with which the subscriber Sub1 is equipped includes a MAC calculator 21, a selector 22, a hash calculator (hash M) 23M, a hash calculator (hash C) 24C, an RTC (real time clock) 25, a signer/verifier 26, and a block counter 27.

The MAC calculator 21 is connected to the non-volatile memory 13 and the selector 22. An input side of the selector 22 is connected to the non-volatile memory 13 and the MAC calculator 21, and an output side thereof is connected to the hash calculator 23M.

The hash calculator 23M is connected to the selector 22, the RTC 25, and the signer/verifier 26. The hash calculator 24C is connected to the non-volatile memory 13. The signer/verifier 26 is connected to the non-volatile memory 13, the hash calculator 23M, the RTC 25, and the block counter 27.

The MAC calculator 21 reads the i-th block Bi from the non-volatile memory 13, and calculates the MAC Ci(D) unique to the terminal D according to Formula (1). Here, the MAC calculator 21 calculates the MAC Ci(S1) unique to the subscriber Sub1. In the description of FIG. 5, the MAC Ci(S1) is described as a MAC Ci from which dependence on the terminal ID is removed.

The MAC Ci (the generated MAC Ci) calculated by the MAC calculator 21 and the MAC Ci(the read MAC Ci) read from the non-volatile memory 13 are input to the selector 22. The selector 22 outputs the generated MAC Ci or the read Ci to the hash calculator 23M and to the outside as the MAC Ci. When the content 50A is received, the selector 22 transfers the read MAC Ci to the hash calculator 23M. Further, when the content 50B is transmitted, the selector 22 outputs the generated MAC Ci to the hash calculator 23M and to the outside.

The RTC 25 holds a current time. The RTC 25 outputs a timestamp T indicating the current time to the signer/verifier 26 and to the outside. The RTC 25 sets the initial value V of a chain of a MAC based on the current time, and outputs the set initial value V to the hash calculator 23M and to the outside. The initial value V is set to, for example, the current time, a random number using the current time as a seed, a hash value based on the current time, or the like.

The hash calculator 23M calculates a hash chain Hi of the MAC Ci. The hash calculator 23M holds an interim hash value (Rm) as a MAC register Rm. The hash calculator 23M obtains a hash value by concatenating the MAC register Rm holding a current hash value with the MAC Ci as in the following Formula (3), and sets the hash value as a value of a new MAC register Rm.

$$Rm \leftarrow Hash(Rm|Ci) \quad (3)$$

The hash calculator 23M sequentially applies Formula while incrementing a block number to be i=1, 2, 3, . . . using the initial value of the MAC register Rm as the initial value V. As a result, the hash calculator 23M calculates the hash value of the hash chain Hi as in Formula (2), and causes the calculated hash value to be held in the MAC register Rm. The hash calculator 23M outputs the calculated hash chain tail Hn to the signer/verifier 26 and to the outside.

Specifically, when the content 50A is received, the hash calculator 23M calculates the hash value H1(P) using the message authentication code C1(P) and the initial value V attached to the received block B1. When Formula (3) is applied using Rm=V and i=1, the updated value of the MAC register Rm is H1(P). Further, the hash calculator 23M calculates the hash value H2(P) using the message authentication code C2(P) attached to the received block B2 and the calculated hash value H1(P) (Formula (3) is applied using i=2). Similarly, the hash calculator 23M calculates the hash value H3(P) using the message authentication code C3(P) attached to the received block B3 and the calculated hash value H2(P) (Formula (3) is applied using i=3). Similarly, the hash calculator 23M calculates the hash value H4(P) using the message authentication code C4(P) attached to the received block B4 and the calculated hash value H3(P) (Formula (3) is applied using i=4). A final value of the MAC register Rm is a hash chain tail H4(P).

When the content 50B is transmitted, the hash calculator 23M calculates the hash value H1(S1) using the message authentication code C1(S1) generated from the block B1 to be transmitted and the initial value V. When Formula (3) is applied using Rm=V and i=1, an updated value of the MAC register Rm is H1(S1). Further, the hash calculator 23M calculates the hash value H2(S1) using the message authentication code C2(S1) generated from the block 132 to be transmitted and the calculated hash value H1(S1) (Formula (3) is applied using i=2). Similarly, the hash calculator 23M calculates the hash value H3(S1) using the message authentication code C3(S1) generated from the block 133 to be transmitted and the calculated hash value H2 (Formula (3) is applied using i=3). Similarly, the hash calculator 23W calculates the hash value H4(S1) using the message authentication code C4(S1) generated from the block 34 to be transmitted and the calculated hash value H3(S1) (Formula (3) is applied using i=4). A final value of the MAC register Rm is a hash chain tail H4(S1).

The hash calculator 24C calculates the hash values (checksums) of the blocks B1|B2| . . . |Bn of the entire content 50X. The hash calculator 24C holds an interim hash value (Rc) as a checksum register Rc in order to sequentially calculate the hash values for the block Bi. The hash calculator 24C compares the calculated value (a final value of the checksum register Rc) with the reference checksum read from the non-volatile memory 13 and checks that the content 50X is not altered by checking that the calculated value is identical to the reference checksum. When the hash value is not identical to the reference checksum, the subscriber Sub1 determines the content 50X to be altered, stops the reception when the content 50A is being received, and stops the transmission when the content 50B is being transmitted.

The block counter 27 counts the number of processed blocks, and holds a block number i (=1, 2, . . . , n) that is currently being processed. The block counter 27 outputs a block count i serving as a count result to the signer/verifier 26 and to the outside.

The signer/verifier 26 verifies the signature σ of the received content 50A. The signer/verifier 26 signs the content 508 to be transmitted. For example, the RSA public-key cryptosystem is used for the signature σ.

The signer/verifier 26 verifies the signature σ attached to the last block of the content 50A when the content 50A is received. Here, the signer/verifier 26 reads the hash value H4(P) received as a part of the content 50A and the signature σ=Sign(P, H4(P)) from the non-volatile memory 13. Then, it is checked whether or not a value obtained by decrypting the signature Sign(P, H4(P)) using the public key Kp(P) of the transmission terminal Pub1 is identical to the received hash value H4(P). When the value is not identical to the received hash value H4(P), the verification of the signature σ fails. Here, the public key Kp(P) of the transmission terminal Pub1 may be acquired directly from the certificate authority of the third party, or a value cached in the terminal Sub1, another terminal, another server, or the like may be used as the public key Kp(P) of the transmission terminal Pub1. In the latter case, the verifier (the reception terminal Sub1) of the signature has responsibility for checking that the public key Kp(P) is the latest key guaranteed by the certificate authority.

The signer/verifier 26 further verifies the received signature σ using the message authentication code Ci(P) attached to the received block Bi, the initial value V, and the hash chain tail Hn calculated by the hash calculator 23M.

Specifically, the signer/verifier 26 compares the hash value H4(P) calculated by the hash calculator 23M with the hash value H4(P) received as a part of the content 50A. When the calculated hash value H4(P) is not identical to the received hash value H4(P), the verification of the signature σ fails.

The signer/verifier 26 further verifies Sign(P, H4(P)) based on the number n of blocks in Sign(P, H4(P)), the timestamp T, and the like. The signer/verifier 26 outputs a receipt indicating success of the verification to the outside after the verification completely succeeds. The receipt includes, for example, information for verifying the sender and the receiver of the content 50A.

Further, when the content 50B is transmitted, the signer/verifier 26 signs the hash chain tail Hn stored in the MAC register Rm after the process of the hash calculator 23M on the last block Bn ends. As a result, sign(D, Hn) is generated. Here, the signer/verifier 26 generates sigh(S1, H4(S1)) using the hash value H4(S1).

Specifically, the signer/verifier 26 generates Sign(S1, H4(S1)) using the hash value H4(S1) calculated by the hash calculator 23M, the timestamp T, and the number n of blocks. The signer/verifier 26 adds the generated Sign(S1, H4(S1)) and the hash value H4(S1) to the last block B4.

Figure 6:
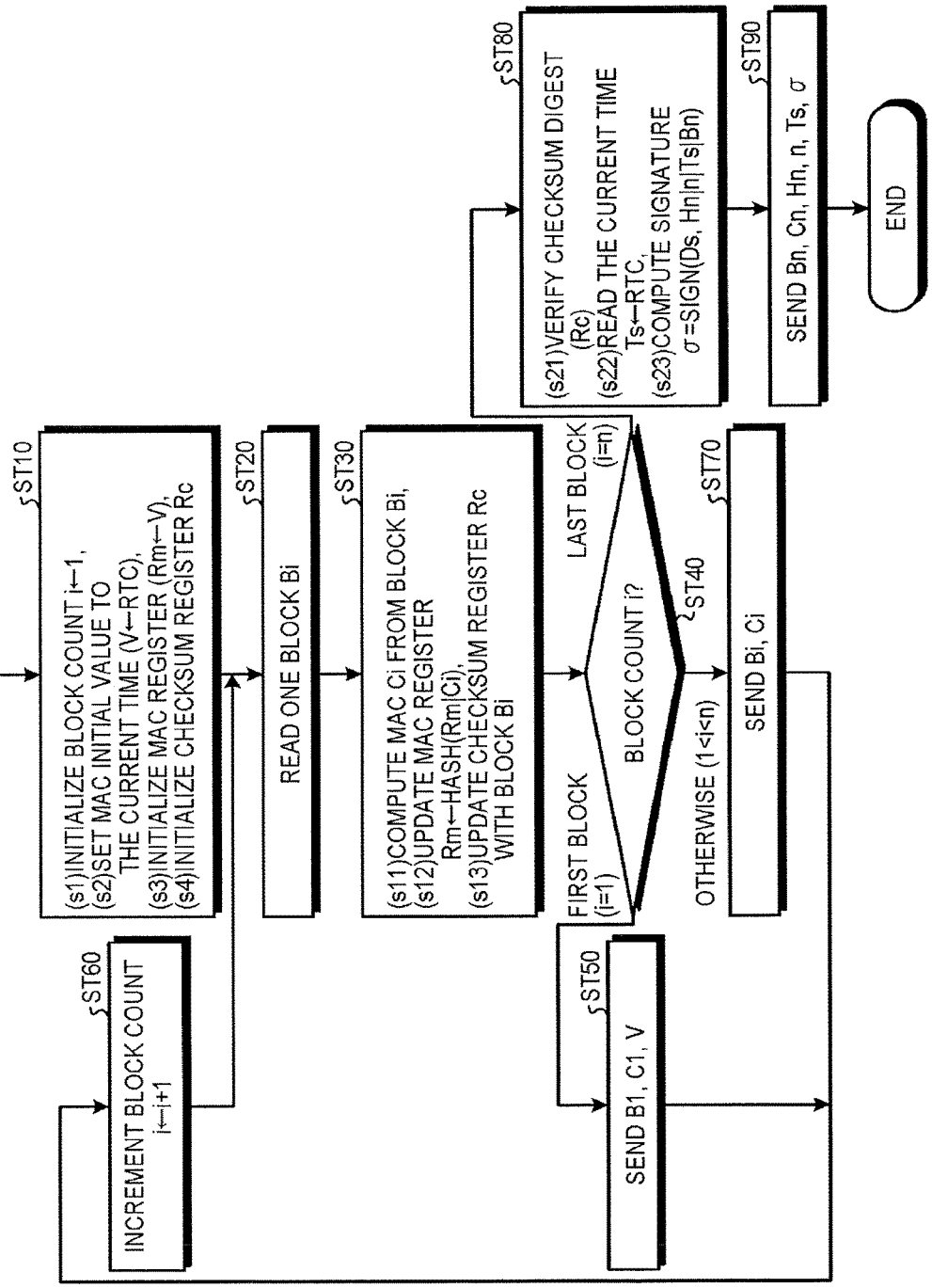
FIG. 6 is a flowchart illustrating a transmission operation process of a subscriber according to an embodiment.

FIG. 6 is a flowchart illustrating a transmission operation process of the subscriber according to an embodiment. The relay authenticator 20 with which the subscriber Sub1 is equipped initializes the register or the like when the content 50B is transmitted (step ST10). Specifically, the following process of (s1) to (s4) is performed.

(s1) The block counter 27 sets the block number i to 1.

(s2) The hash calculator 23M sets the initial value of the chain of the MAC to V. For example, when the initial value V is the current time obtained from the RTC 25, the RTC 25 inputs the current time to the hash calculator 23M.

(s3) The hash calculator 23M initializes the MAC register Rm to V.

(s4) The hash calculator 24C initializes the checksum register Rc.

The signer/verifier 26 reads the block Bi from the non-volatile memory 13 (step ST20). Then, a calculation of the MAC Ci and the hash value and updating of the register are performed (step ST30). Specifically, the following process of (s11) to (s13) is performed.

(s11) The MAC calculator 21 calculates the MAC Ci of the block Bi.

(s12) The hash calculator updates the MAC register Rm using the generated MAC Ci according to Formula (3). Specifically, the hash calculator 23M calculates Hash (Rm|Ci), and sets the calculation result to the MAC register Rm.

(s13) The hash calculator 24C updates the checksum register Rc for the block Bi.

Thereafter, branching is performed based on the block number. Specifically, the relay authenticator 20 checks the block number of the block Bi (step ST40). When the block Bi is the first block (step ST40, i=1), the subscriber Sub1 transmits the MAC C1 and the initial value V to the subscriber Sub2 together with the block B1 (step ST50). Then, the block counter 27 increments the block number i (step ST60). Thereafter, the process of steps ST20 to ST40 is performed.

Then, when the block Bi is neither the first block nor the last block (step ST40, 1<i<n), the subscriber Sub1 transmits the MAC Ci to the subscriber Sub2 together with the block Bi (step ST70). Then, the block counter 27 increments the block number i (step ST60). Thereafter, the process of steps ST20 to ST40 is performed. Then, the process of ST70, ST60, and steps ST20 to ST40 is repeated until the block Bi becomes the last block.

When the block Bi becomes the last block (step ST40, i=n), the verification process and the signature process are performed (step ST80). Specifically, the following process of to (s23) is performed.

(s21) T hash calculator 24C outputs a checksum Digest (Rc) from the checksum register Rc, and verifies the checksum Digest (Rc) by comparing the checksum Digest (Rc) with the reference checksum. The hash calculator 24C outputs an error when the checksum Digest (Rc) is not identical to the reference checksum.

(s22) T signer/verifier 26 obtains a current time (transmission time) Ts from the RTC 25.

(s23) The signer/verifier 26 obtains the signature G by executing the signature unique to the subscriber Sub1 on the number n of blocks, the time Ts, the block Bn, and the hash chain tail Hn stored in the MAC register Rm. The signature σ is, for example, sign(Ds, Hn|n|Ts|Bn).

Thereafter, the subscriber Sub1 transmits Cn, Hn, n, Ts, and the signature σ to the subscriber Sub2 together with the block Bn (step ST90). Then, the transmission process ends.

Figure 7:
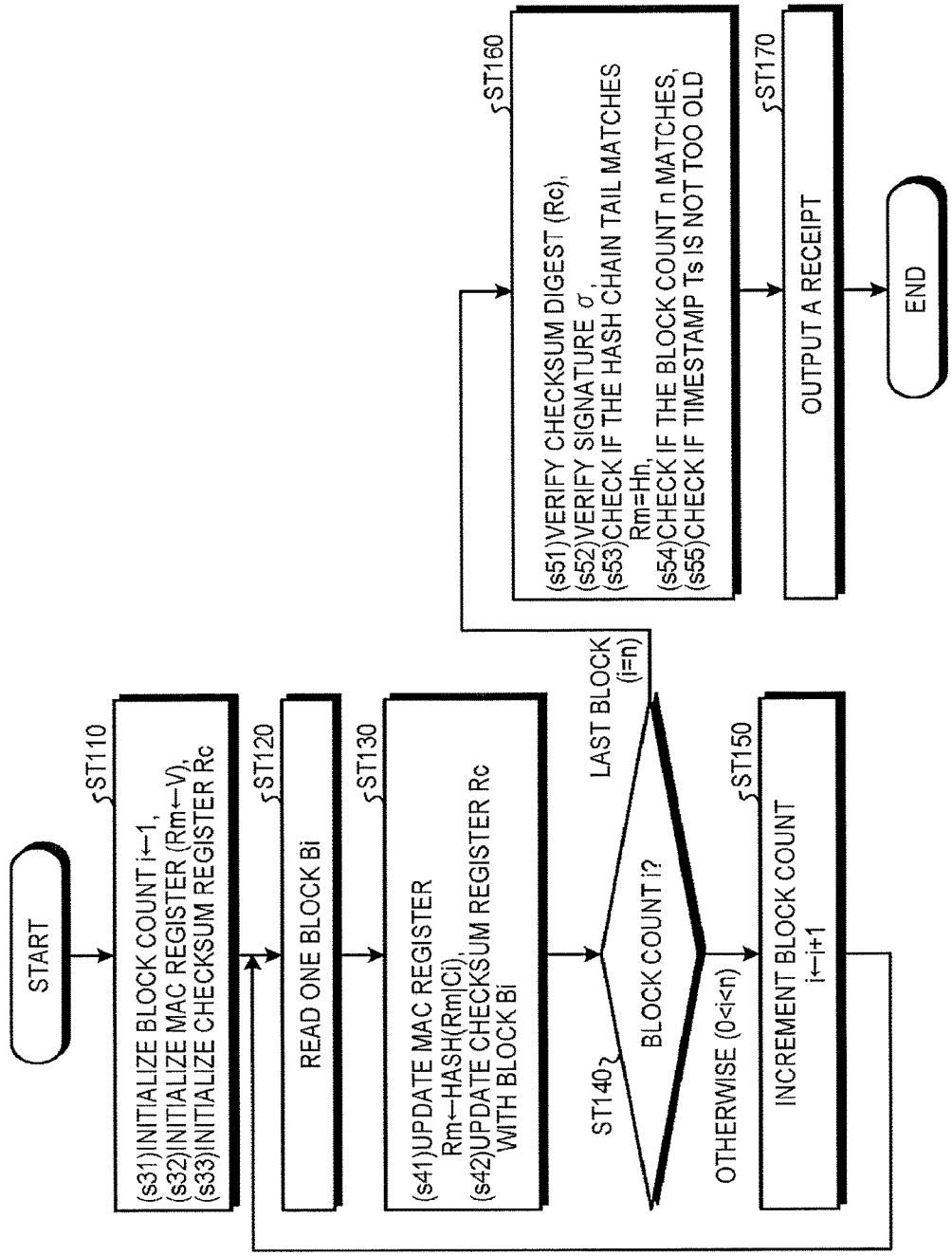
FIG. 7 is a flowchart illustrating a reception operation process of a subscriber according to an embodiment.

FIG. 7 is a flowchart illustrating a reception operation process of the subscriber according to an embodiment. The relay authenticator 20 with which the subscriber Sub1 is equipped initializes the register or the like when the content 50A is received (step ST110). Specifically, the following process of (s31) to (s33) is performed.

(s31) The block counter 27 sets the block number i to 1.

(s32) The hash calculator 23M initializes the MAC register Rm to the received initial value V.

(s33) The hash calculator 24C initializes the checksum register Rc.

The signer/verifier 26 reads the block Bi from the non-volatile memory 13 (step ST120). Then, for example, the register is updated (step ST130). Specifically, the process of (s41) to (s42) is performed.

(s41) The hash calculator 23M updates the MAC register Rm using the received MAC value Ci according to Formula (3). Specifically, the hash calculator 23W calculates Hash (Rm|Ci), and sets the calculation result to the MAC register Rm. At this time, the MAC calculator 21 is not used.

(s42) The hash calculator 24C updates the checksum register Rc for the block Bi.

Thereafter, branching is performed based on the block number. Specifically, the relay authenticator 20 checks the block number of the block Bi (step ST140). When the block Bi is not the last block (step ST140, 0<i<n), the block counter 27 increments the block number i (step ST150). Thereafter, the process of steps ST120 to ST140 is performed. Then, the process of ST150 and steps ST120 to ST140 is repeated until the block Bi becomes the last block.

When the block Bi becomes the last block (step ST140, i=n), the verification process and the like are performed (step ST160). Specifically, the following process of (s51) to (s55) is performed.

(s51) The hash calculator 24C outputs a checksum Digest (Rc) from the checksum register Rc, and verifies the checksum Digest (Rc) by comparing the checksum Digest (Rc) with the reference checksum. The hash calculator 24C outputs an error when the checksum Digest (Rc) is not identical to the reference checksum.

(s52) The signer/verifier 26 verifies the received signature σ.

(s53) The signer/verifier 26 verifies the hash chain tail Hn in the received signature σ. Specifically, the signer/verifier 26 checks whether or not the hash chain tail Hn is identical to the MAC register Rm updated in step ST130.

(s54) The signer/verifier 26 verifies the number n of blocks in the received signature σ. Specifically, the signer/verifier 26 checks whether or not the number n of blocks is identical to the number of received blocks.

(s55) The signer/verifier 26 verifies the transmission time Ts in the received signature σ. Specifically, the signer/verifier 26 obtains a current time (reception time) Tr from the RTC 25, and checks whether or not a difference from the transmission time Ts is smaller than a threshold value E (Tr−Ts<E).

When all verifications of step ST160 succeed, the subscriber Sub1 outputs the receipt (step ST170). As described above, the subscriber Sub1 serving as the transmission terminal Ds allocates a message authentication code to each of blocks obtained by dividing the content 50X when each of the blocks is transmitted to the subscriber Sub2 serving as the reception terminal Dr. The subscriber Sub1 generates the signature σ in which the message authentication codes of a plurality of blocks are used as an input and allocates the signature σ to one of the plurality of blocks. The subscriber Sub2 outputs the reception verifications (receipt) of the plurality of blocks only when the signature σ allocated by the subscriber Sub1 has been verified for the received data. Since the message authentication codes of all of the plurality of blocks are necessary for the verification of the signature σ, the subscriber Sub2 can verify that all the blocks have been received from the subscriber Sub1.

The relay authenticator 20 is assumed to be configured in a black box form so that it is invisible to a user space application. In other words, among the data or the values appearing in the above transmission and reception processes, the data or the values that are not transmitted or received through the network interface 11 can be neither referenced nor modified by user applications in the inside of the subscriber Sx serving as the communication apparatus or by the outside. The data or the values include a MAC secret key Km(D), the secret key Ks(D) for the signature, the MAC register Rm, the checksum register Rc, the RTC, and the block count i.

For example, when the relay authenticator 20 is implemented as a hardware chip, only control of input data and reading of output data can be performed. Further, when the relay authenticator 2C is implemented as software, the relay authenticator 20 is executed in a secure environment such as a trusted execution environment. Thus, other applications cannot reference or modify content of the memory of the relay authenticator 20. The MAC secret key Km(D) is encrypted and stored in a hardware chip, firmware, or the non-volatile memory 13 and read when the relay authenticator is activated. Alternatively, when the relay authenticator is activated, the MAC secret key Km(D) may be generated based on a random number. As described above, in the present embodiment, since the MAC secret key Km(D) is not shared between the terminals, an operation intended in the present embodiment is performed even when the MAC secret key Km(D) is generated and updated as necessary. An inner padding I and an outer padding O serving as fixed values in Formula (1) which is used for generation of the message authentication code need not be shared by all the terminals. The fixed values I and O may be stored in a hardware chip, firmware, or the non-volatile memory 13 in a non-encrypted state.

When the additional information such as Ci, V, Hn, n, Ts, and σ described above with reference to FIG. 6 is generated, the process corresponding to block count i may be performed on the fly at the same time as when the data sender/receiver 12 transmits the block Bi. Or, the data sender/receiver 12 may perform the process corresponding to the block count i before the block Bi is transmitted and store the additional information that is calculated in advance in a buffer (that is not allowed to be referenced from the outside) in the relay authenticator 20. However, when the time Ts at which the transmission terminal Ds calculated the additional information is too old, the reception terminal Dr determines that the difference with the reception time Tr is too large (Tr−Ts>E), and the authentication fails. For this reason, even if the transmission terminal Ds calculates the additional information in advance, the transmission terminal Ds needs to start the transmission within a period of time sufficiently smaller than the threshold value E.

In the case of the reception process described above with reference to FIG. 7, the data sender/receiver 12 may perform the process corresponding to the block count i on the fly at the same time as when the block Bi is received. Or, the data sender/receiver 12 may first store the received data in a storage such as a hard disk or a non-volatile memory (the non-volatile memory 13), then read the received data again and perform the process corresponding to the block count i.

In the description of FIG. 5, the example in which the relay authenticator 20 reads data from the non-volatile memory 13 is described, but when the process is performed on the fly, a buffer in the network interface 11 or in the data sender/receiver 12 may be used in place of the non-volatile memory 13.

When the content 50 is transmitted or received using a communication path that is low in reliability such as wireless communication, there is a possibility that the block hi will be lost. In this case, the transmission terminal Ds retransmits a lost block in response to a request of the reception terminal Dr, but when the retransmission is performed in asynchronization with sequential transmission of the blocks Bi, the transmission terminal Ds needs to retransmit the lost block Bj (j<i) whose location in the chunk is prior to the block Bi that is sequentially being transmitted. When such a need is anticipated, the additional information (Ci, V, Hn, n, Ts, σ) obtained by the process of FIG. 6 needs to be temporarily stored in a buffer in the relay authenticator 20 regardless of whether or not the process is performed on the fly. The block Bi does not necessarily reach the reception terminal Dr in the order of the block number i. For this reason, in the environment in which the retransmission occurs, the reception terminal Dr stores the blocks Bi in the non-volatile memory 13, receives data until the blocks Bi can be sequentially processed, and then perform the process described above with reference to FIG. 7.

Figure 8:
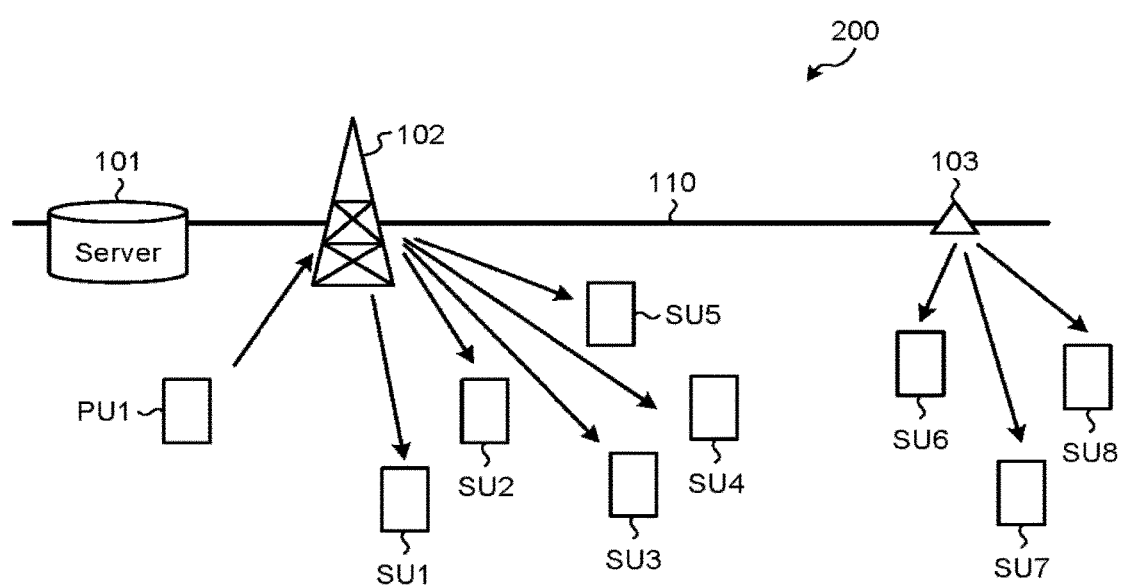
FIG. 8 is a diagram for describing a load on a cell tower or an access point.

Next, a problem when the content 50 is delivered without using the peer-to-peer network will be described. FIG. 8 is a diagram for describing a load of a cell tower or an access point. A communication network 200 includes a server 101, a cell tower 102 serving as a radio wave tower, and an access point 103 as a network infrastructure. The server 101, the cell tower 102, and the access point 103 are connected with one another through a wired backbone network 110. Here, the subscriber includes subscribers SU1 to SU8, and the publisher includes a publisher PU1. In the following description, the subscribers SU1 to SU8 are also individually or collectively referred to as a "subscriber SUx".

The access point 103 performs wireless communication with the subscriber SUx in a wireless local area network (LAN) hotspot such as a Wi-Fi (a registered trademark) hotspot. The access point 103 is a communication device to which wireless communication terminals such as a mobile phone and a tablet terminal can be wirelessly connected. Here, an example in which the subscribers SU6 to SU8 are connected to the access point 103 is illustrated.

The cell tower 102 is a base station of wireless communication, and performs wireless communication with the subscriber SUx or the publisher PU1 using a communication means such as a mobile phone network. The server 101 receives data uploaded from the publisher PU1 through the cell tower 102 and stores the received data. The server 101 transmits data (content or the like) in the server 101 to the subscriber SUx through the cell tower 102. Here, an example in which the subscribers SU1 to SU5 and the publisher PU1 are connected to the cell tower 102 is illustrated.

In the communication network 200, the publisher PU1 can perform wireless communication with the cell tower 102 or the like. In the communication network 200, the subscriber SUx is connected to the cell tower 102 or the access point 103 and can receive content from the publisher PU1.

In the communication network 200, content is transmitted from the publisher PU1 to the subscriber SUx through the cell tower 102 or the access point 103. In other words, content is delivered from the cell tower 102 or the access point 103 to the subscriber SUx with no data relay performed by the subscriber SUx.

In the communication network 200, a process of delivering common data to a plurality of subscribers SUx such as content delivery is performed. In this case, when data is transmitted from the publisher PU1 or the server 101 serving as the data source to all the subscribers SUx, a processing load and a communication load of the publisher PU1 or the server 101 are increased. A technique of arranging a replica of the publisher PU1 such as a mirror server and distributing load is considered, but it is commonly necessary for a content distributor to manage such a replica terminal, and thus it incurs costs for installation or management.

For example, when the subscribers SUx are mobile terminals (mobile devices) (typically, mobile phones) carried by the users, each subscriber SUx receives data from the server using a mobile phone network or the like. In this case, in a place where many users gather such as a city or an event site, a load of the radio wave tower (the cell tower 102) that provides the mobile phone network or the access point 103 (hotspot) that provides Wi-Fi access is increased, and thus a communication speed is decreased. In other words, in addition to the server 101, a load of a network infrastructure is increased as well.

On the other hand, when the subscriber SUx that has received data transfers the data to another subscriber SUx, the load of the publisher PU1 can be reduced. A network in which the subscriber SUx relays data, and communication is performed between the subscribers SUx is a peer-to-peer (P2P) network. In the peer-to-peer network in which the mobile terminal is the subscriber SUx, the subscriber SUx relays data without using the mobile phone network or the like, and thus the load of the infrastructure is reduced. Such a network is a mobile P2P network.

In the content delivery in the peer-to-peer network, the subscriber SUx that has received data is expected to relay the data, but a data relay load differs according to the subscriber SUx.

In the peer-to-peer network, there are cases in which it is desired to verify that transmission and reception of data have been performed in order to measure a degree of contribution of the subscriber SUx. For example, suppose the current publisher PU1 or the subscriber SUx (the transmission terminal Dsx) have transmitted data to one or more other subscribers (the reception terminal Drx) SUx. In this case, since it is desired to verify that data has been transmitted the transmission terminal Dsx to the reception terminal Drx, the receipt information is collected.

Here, a method capable of checking a transmission source of data at a reception terminal will be described. In this method, when stream data having a large size or having no end is transmitted, the data is commonly divided into small units (blocks). The message authentication code (MAC) Ci is allocated to each block. Using the MAC, the reception terminal Drx can confirm that received data is data transmitted by the transmission terminal Dsx. Further, since a process is performed in units of blocks, there is an advantage in that authentication can be performed in units of blocks without waiting for reception of whole content to complete. However, in this method, it is hard to verify to the third party the fact that data has been received from the transmission terminal Dsx.

Next, a method capable of verifying transmission and reception of data to the third party will be described. In this method, the transmission terminal Dsx allocates the signature σ to data, and thus the reception terminal Drx can verify to the third party that the data has been transmitted from the transmission terminal Dsx. However, in this method, since a calculation amount of the signature σ is large, when the signature σ is allocated in units of blocks, both the transmission terminal Dsx that generates the signature σ and the reception terminal Drx that verifies the signature σ undergo an increase in a processing load.

In this regard, transmission and reception of data may be verified to the third party by generating a chain of hash values and allocating the signature σ only to a hash value that is a result of chaining a plurality of blocks. In this method, a cryptographic hash value of a certain block is calculated. Then, the calculated value is concatenated to data of another block, a hash value is similarly calculated for the concatenated data, the calculated value is further concatenated to data of another block, and a hash value is calculated for the concatenated data. Then, the signature σ is allocated only to a hash value that is a result of chaining a plurality of blocks.

Figure 9A:
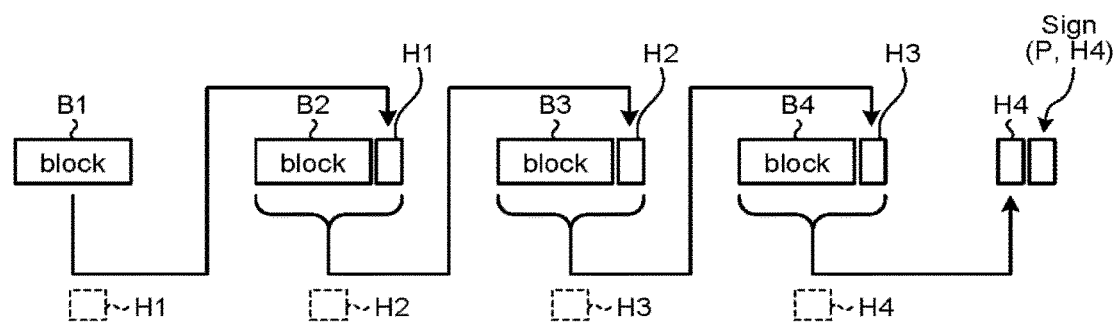
FIGS. 9A and 9B are diagram for describing a data transmission method using a chain of hash values.
Figure 9B:
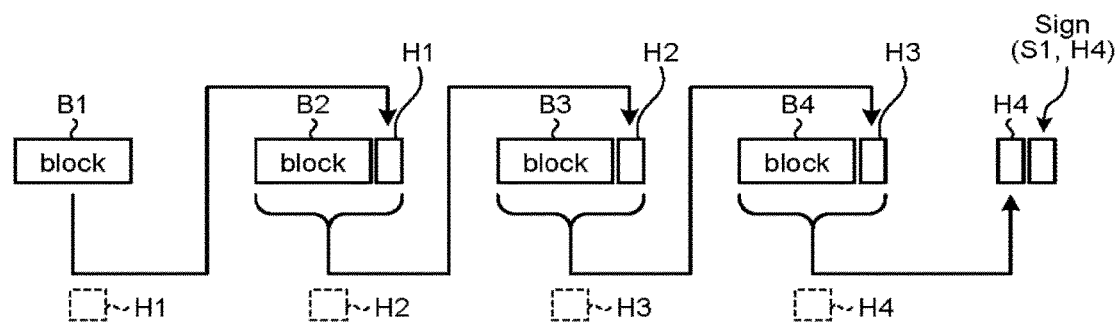

FIGS. 9A and 9B are diagram for describing a data transmission method using a chain of hash values. FIG. 9A illustrates a configuration of data generated by the publisher PU1, and FIG. 9B illustrates a configuration of data generated by the subscriber SUx.

Content is assumed to be configured with four blocks, that is, the blocks B1, B2, B3, and B4 and delivered from the publisher PU1 to the subscriber SU2 through the subscriber all. The publisher PU1 calculates H1=Hash(B1) serving as the hash value H1 of a certain block (Here, the first block B1) as illustrated in FIG. 9A.

Then, the publisher PU1 concatenates the hash value H1 to the neighboring block B2, and calculates the hash value H2. The hash value H2 is H2=Hash(B2|H1). Similarly, the publisher PU1 repeats concatenation of data and a calculation of a hash value. Specifically, the publisher PU1 signs the hash value H4 using H3=Hash(B3|H2) and H4=Hash(B4|H3). The signature σ of the hash value H4 by the publisher PU1 is Sign(P, H4). The publisher PU1 transmits the hash values H1, H2, H3, and H4 and the signature σ=Sign(P, H4) to the subscriber SU1 in addition to the blocks B1, B2, B3, and B4.

The subscriber SU1 calculates the hash values H1, H2, H3, and H4 using the same method as in the publisher PU1. Then, the publisher PU1 signs the hash value H4. The signature σ of the hash value H4 by the subscriber SU1 is Sign(S1, H4). The subscriber SU1 transmits the hash values H1, H2, H3, and H4 and the signature σ=Sign(S1, H4) to the subscriber SU2 in addition to the blocks B1, B2, B3, and B4. As described above, content is delivered from the publisher PU1 to the subscriber SU2 through the subscriber SU1.

According to this method, the transmission terminal Dsx and the reception terminal Drx perform a single signature process (generation or verification) on a plurality of blocks together, and thus the reception terminal Drx can verify to the third party that each of a plurality of blocks is a block transmitted from the publisher. However, in this method, the transmission data (block data BD1 to BD4 and the hash values H1 to H4) excluding the signature σ is the same for the same content regardless of the transmission terminal Dsx. For this reason, even when the subscriber SU1 replaces the signature σ=Sign(P, H4) with its own Sign(S1, H4) and relays it, it is difficult for the subscriber SU2 to distinguish whether the received data excluding the signature σ is data received directly from the publisher PU1 or data received from the relay entity SU1 and to verify it to the third party.

On the other hand, the subscriber Sx in the communication network 100 allocates the message authentication code Ci unique to the subscriber Sx to each block, and generates the signature σ in which the message authentication codes Ci of a plurality of blocks are input. Then, the subscriber Sx adds the message authentication code Ci (the block authentication code), the hash value H4 (the content authentication code), and the signature σ to the content, and transmits the resulting content to another subscriber Sx. As a result, it is possible to verify to the third party transmission and reception between the transmission terminals Ss other than the publisher, that is, the subscribers Sx serving as the relay entity.

Next, a possible attack such as the alteration of the receipt information and a reason why it is difficult or not logical to perform the attack when it is applied to the subscriber Sx will be described.

(First Case)

The transmission terminal Ds insists that it has transmitted the content 50 that is not transmitted.

(Reason Why There is No Problem Even in First Case)

In the communication network 100, the reception terminal Dr outputs the receipt information, and thus this problem does not occur.

(Second Case)

The reception terminal Dr insists that it has received the content 50 that has not been received.

(Reason Why There is No Problem Even in Second Case)

The fact that the reception terminal Dr has received the content is verified based on the receipt, but in order to generate the receipt, the signature σ of the transmission terminal Ds and all the MACs Ci(Ds) associated with the signature σ are necessary. Further, the MAC secret key Km(Ds) of the transmission terminal Ds is necessary for generation of the MAC Ci(Ds), and the secret key Ks(Ds) for the signature of the transmission terminal Ds is necessary for the signature σ. Thus, it is hard to forge the MAC Ci(Ds) and the signature σ without knowing the keys.

(Third Case)

The reception terminal Dr insists that the chunk received from the transmission terminal Ds has been received from another transmission terminal Ds'.

(Reason Why There is No Problem Even in Third Case)

Since it is difficult to fake the signature a, the reception terminal Dr receives only the last block Bn to which the signature σ' is allocated by the transmission terminal Ds' from the transmission terminal Ds', and generates the receipt using the blocks received from the transmission terminal Ds as the other blocks Bi (i<n). In this case, the reception terminal Dr needs the MAC Ci(Ds') of the transmission terminal Ds' for verification of the signature σ'. However, since the block Bi is received from the transmission terminal Ds, the reception terminal Dr holds the MAC Ci(Ds) and fails to generate the receipt.

(Fourth Case)

The reception terminal Dr generates the receipt again for the chunk for which the receipt has been already generated. In other words, a plurality of transmissions are claimed to have been performed for single transmission.

(Reason Why There is No Problem Even in Fourth Case)

Since the reception terminal Dr can generate the receipt only when the difference between the transmission time Ts and the reception time Tr is the threshold value E or less, it is not possible to generate the receipt for the received chunk after a certain period of time elapses. The reception terminal Dr can generate the receipt for a recently received chunk in which the difference between the transmission time Ts and the reception time Tr is the threshold value E or less, but a plurality of receipts generated in this way have the same substance except that the receipts differ in the reception time Tr. For this reason, a collector of the receipt information (receipt) can keep only the receipt having the most recent reception time Tr and discard the remaining receipts (Fifth Case)

The transmission terminal Ds generates the MAC and the signature σ again for the chunk already shared by the transmission terminal Ds and the reception terminal Dr, and the reception terminal Dr receives only the MAC and the signature σ and generates the receipt by allocating the MAC and the signature σ to the chunk data already held therein. Since the transmission terminal Ds generates the MAC and the signature σ again, the difference between the transmission time Ts and the reception time Tr can always be small. For this reason, the receipt can be generated.

(Reason Why There is No Problem Even in Fifth Case)

Similarly to the fourth case, since the receipts have the same substances except that the receipts differ in the transmission time Ts and the reception time Tr, the collector can detect it.

(Sixth Case)

The transmission terminal Ds and the reception terminal Dr, in collusion with each other, insist that the reception terminal Dr has received the chunk when in reality only a smaller amount of communication than is necessary to transmit all the chunk data has been performed. If the transmission terminal Ds and the reception terminal Dr agree to transmit m (<n) blocks smaller than n blocks, and alter the chunk size of the ToC and the checksums of the chunks to be transmitted, the reception terminal Dr can output the receipt.

(Reason Why There is No Problem Even in Sixth Case)

Since information indicating the number m of blocks is embedded in the receipt, the collector can reject the receipt when the information is not identical to that of the ToC.

(Seventh Case)

The transmission terminal Ds transmits a chunk using the MAC Ci(Ds') and the signature σ' generated by another transmission terminal Ds', and the reception terminal Dr insists that the reception terminal Dr has received the chunk from the transmission terminal Ds' although in reality the chunk has been received from the transmission terminal Ds. Although the transmission terminal Ds has transmitted the chunk to the reception terminal Dr, the transmission terminal Ds gives a credit of the data relay to the transmission terminal Ds'.

(Reason why there is No Problem Even in Seventh Case)

It is a responsibility of the transmission terminal Ds to allocate its own MAC Ci(Ds) and the signature σ through the process of the present embodiment so that the transmission terminal Ds is credited properly.

(Eighth Case)

The reception terminal Dr does not transmit the receipt to the collector.

(Reason Why There is No Problem Even in Eighth Case)

Since this is possible, a mechanism (the following example or the like) of encouraging submission of the receipt is used.

First Example

A certain reward is given to the reception terminal Dr that has submitted the receipt.

Second Example

The number of submissions of receipts of each terminal is opened to the public. A terminal that is large in the number of submissions of receipts is regarded as an excellent reception terminal Dr, and content is delivered to the terminal that is large in the number of submissions of receipts with a higher priority than terminal that is small in the umber of submissions of receipts.

Third Example

In the use case in which encrypted content is delivered through the peer-to-peer network, and a decryption key for browsing content needs to be separately obtained from a content provider, submission of the receipt is set as a condition of a key provision.

As described above, the subscriber Sub1 of the present embodiment includes the data sender/receiver 12. The data sender/receiver 12 receives the content 50A or the like from a first other terminal (for example, the publisher Pub1 or the like). The content 50A includes the additional information INFO (P) unique to the publisher Pub1 and a plurality of blocks Bi. The data sender/receiver 12 generates the content 50B, and transmits the content 505 to a second other terminal (the subscriber Sub2 or the like). The second content 505 includes the additional information INFO unique to the subscriber Sub1 and a plurality of blocks Bi. The data sender/receiver 12 further includes the relay authenticator 20. The relay authenticator 20 generates the additional information INFO (S1). The additional information INFO (S1) includes the message authentication code Ci(S1), the hash value Hn(S1), and Sign(S1, Hn(S1)). The message authentication code Ci(S1) information according to the subscriber Sub1 and the block Bi. The hash value Hn(S1) is information according to the subscriber Sub1 and the blocks B1 to Bn. Further, Sign(S1, Hn(S1)) is information unique to the subscriber Sub1 and the hash value Hn(S1). The relay authenticator 20 verifies that the transmission source of the content 50A is the publisher Pub1 based on the additional information INFO (P), and generates the receipt information indicating the fact that the content 50A has been received when it is verified. Then, the data sender/receiver 12 transmits the receipt information to an external apparatus such as a third party authority.

As described above, according to an embodiment, the subscriber Sx transmits the content 50 to which information unique to the subscriber Sx is added, and thus it is possible to collect the receipt information while preventing the receipt information from being altered.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A communication apparatus, comprising: a data sender/receiver that receives first content from a first terminal, generates second content, and transmits the second content to a second terminal, the first content including first to n-th (n is an integer of 2 or more) blocks and first additional information unique to the first terminal, the second content including second additional information unique to the communication apparatus and the first to n-th blocks, the data sender/receiver including a relay authenticator, wherein the relay authenticator generates the second additional information, the second additional information including first to n-th block authentication codes, a first content authentication code, and a first signature, the p-th (p is an integer of 1 or more and n or less) block authentication code being information corresponding to the communication apparatus and the p-th block, the first content authentication code being information based on the communication apparatus and the first to n-th blocks, the first signature being information based on the first content authentication code, the relay authenticator generates receipt information indicating that the first content has been received when a transmission source of the first content is determined to be the first terminal based on the first additional information, and the data sender/receiver transmits the receipt information to an external apparatus, and wherein the first additional information includes a transmission time at which the first terminal has transmitted the first content, and the relay authenticator determines whether or not the transmission source of the first content is the first terminal based on the transmission time and a reception time at which the first content has been received.

2. The communication apparatus according to claim 1, wherein the first additional information includes (n+1)-th to 2n-th block authentication codes, a second content authentication code, and a second signature, the q-th (q is an integer of (n+1) or more and 2n or less) block authentication codes being information corresponding to the first terminal and the (q-n)-th block, the second content authentication code being information based on the first terminal and the first to n-th blocks, and the second signature being information based on the second content authentication code.

3. The communication apparatus according to claim 2, wherein, in the determining, the relay authenticator determines whether not it is possible to generate the second content authentication code using the (n+1)-th to 2n-th block authentication codes and determines whether or not the second signature is a signature transmitted from the first terminal.

4. The communication apparatus according to claim 1, wherein the receipt information includes first identification information identifying the first terminal and second identification information identifying the communication apparatus.

5. The communication apparatus according to claim 1, wherein a third signature of the communication apparatus is added to the receipt information.

6. The communication apparatus according to claim 1, wherein the relay authenticator calculates first to n-th hash values, calculates the first content authentication code using the n-th hash value, calculates the first hash value using the first block authentication code, and calculates the r-th hash value using the r-th (r is an integer of 2 or more and n or less) block authentication code and the (r−1)-th hash value.

7. The communication apparatus according to claim 6, wherein the relay authenticator calculates the first hash value using a first initial value and the first block authentication code, and the data sender/receiver adds the first initial value to the second content, and transmits the second content including the first initial value to the second terminal.

8. The communication apparatus according to claim 1, wherein the data sender/receiver performs peer-to-peer wireless communication with the first terminal, and performs the peer-to-peer wireless communication with the second terminal.

9. The communication apparatus according to claim 1, wherein the relay authenticator generates the first signature by signing the first content authentication code.

10. The communication apparatus according to claim 1, wherein the data sender/receiver transmits the p-th block authentication code and the p-th block to the second terminal in association with one another.

11. The communication apparatus according to claim 1, wherein the relay authenticator verifies that the transmission source of the first content is the first terminal based on the number n of blocks included in the first content.

12. The communication apparatus according to claim 1, wherein a secret key for generating the first signature is set to the communication apparatus without being opened to other communication terminals, and the first signature is able to be decoded using a public key that is guaranteed to be associated with the communication apparatus by a certificate authority.

13. The communication apparatus according to claim 1, wherein the relay authenticator verifies integrity of the first content using a checksum.

14. The communication apparatus according to claim 1, wherein the receipt information includes the transmission time and the reception time.

15. The communication apparatus according to claim 1, wherein the receipt information includes at least one of the number n of blocks included in the first content, a data size of the first content, third identification information identifying the first content, fourth identification information identifying a file included in the first content, and fifth identification information identifying a chunk included in the file.

16. The communication apparatus according to claim 3, wherein the first additional information includes a second initial value, and the relay authenticator determines whether or not it is possible to generate the second content authentication code further using the second initial value in the determining.

17. The communication apparatus according to claim 1, wherein the second content includes a plurality of files, the plurality of files includes a plurality of chunks, and the plurality of chunks includes the first to n-th blocks.

18. The communication apparatus according to claim 1, further comprising a non-volatile memory, wherein the data sender/receiver generates the first additional information and the first to n-th blocks from the received first content, and stores the first additional information and the first to n-th blocks in the non-volatile memory.

19. The communication apparatus according to claim 18, wherein the data sender/receiver reads the first to n-th blocks from the non-volatile memory, and generates the second content using the first to n-th blocks.

* * * * *